United States Patent
Ishida (10) Patent No.: US 9,381,751 B2
(45) Date of Patent: Jul. 5, 2016

(54) INKJET PRINTING APPARATUS

(71) Applicant: RISO KAGAKU CORPORATION, Tokyo (JP)

(72) Inventor: Mari Ishida, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 14/497,821

(22) Filed: Sep. 26, 2014

(65) Prior Publication Data

US 2015/0091959 A1 Apr. 2, 2015

(30) Foreign Application Priority Data

Sep. 30, 2013 (JP) .................................. 2013-203316

(51) Int. Cl.
| | |
|---|---|
| *B41J 29/38* | (2006.01) |
| *B41J 2/205* | (2006.01) |
| *B41J 2/21* | (2006.01) |
| *G06K 15/10* | (2006.01) |
| *G06K 15/02* | (2006.01) |

(52) U.S. Cl.
CPC .............. *B41J 2/2056* (2013.01); *B41J 2/2128* (2013.01); *B41J 2/2132* (2013.01); *G06K 15/102* (2013.01); *G06K 15/1868* (2013.01); *G06K 15/188* (2013.01)

(58) Field of Classification Search
CPC ...... B41J 2/2132; B41J 2/362; G06K 15/102; G06K 15/1868; G06K 15/188
USPC ................................. 347/9, 12, 14, 15, 20, 43
See application file for complete search history.

(56) References Cited

U.S. PATENT DOCUMENTS

| | | | | |
|---|---|---|---|---|
| 5,764,254 | A * | 6/1998 | Nicoloff et al. .................. | 347/43 |
| 5,949,453 | A * | 9/1999 | Harris et al. ..................... | 347/43 |
| 8,807,685 | B2 * | 8/2014 | Ishida .............................. | 347/14 |
| 2006/0082630 | A1* | 4/2006 | Kato et al. ..................... | 347/100 |
| 2012/0075375 | A1* | 3/2012 | Ebisawa ......................... | 347/15 |
| 2013/0100191 | A1* | 4/2013 | Miyamoto et al. .............. | 347/14 |
| 2013/0342598 | A1* | 12/2013 | Nakamura ...................... | 347/12 |

FOREIGN PATENT DOCUMENTS

JP 2012-131086 7/2012

* cited by examiner

*Primary Examiner* — Julian Huffman
*Assistant Examiner* — Sharon A Polk
(74) *Attorney, Agent, or Firm* — Hamre, Schumann, Mueller & Larson, P.C.

(57) ABSTRACT

An inkjet printing apparatus includes: a printing unit including an inkjet head that ejects a red ink and an inkjet head that ejects a black ink having resolution twice that of the above-described inkjet head in a main scanning direction and a sub-scanning direction, respectively, this printing unit performing printing on a sheet by ejecting inks from the inkjet heads while transferring the sheet; and a controller that controls the printing unit. In a pixel at an edge of a line drawing formed by two color inks, the edge being in a landing deviation direction of a dot with the red ink relative to dots with the black ink, the controller increases the number of drops to the dots with black on the side of the landing deviation direction.

6 Claims, 7 Drawing Sheets

INKJET PRINTING APPARATUS

BACKGROUND

1. Technical Field

The present invention relates to an inkjet printing apparatus that ejects ink on a printing medium to perform printing.

2. Background Art

There has been known an inkjet printing apparatus that ejects a droplet of ink on a sheet from a nozzle of an inkjet head to print an image.

Furthermore, there is an inkjet printing apparatus that can perform two-color printing using two color inks (see, for example, Patent Document 1).

RELATED ART

Patent Document 1: Japanese Patent Application Publication No. 2012-131086

SUMMARY

In the inkjet printing apparatus that can perform the two-color printing described above, landing deviation of ink may occur due to misalignment of the inkjet head mounting position. This deviation of the landed ink makes color shift highly recognizable at an edge of a line drawing such as a letter or a thin line printed with two color inks in the case where a difference in luminance is large between the two colors. This causes deterioration in print image quality.

The present invention has been made in view of the above, and an object of the present invention is to provide an inkjet printing apparatus that can suppress a reduction in print image quality.

In order to achieve the above object, an inkjet printing apparatus according to the present invention includes a printing unit and a controller that controls the printing unit. The printing unit includes a first inkjet head that ejects a first ink, and a second inkjet head that ejects a second ink having a luminance lower than that of the first ink by a predetermined value or more, with a resolution higher than that of the first inkjet head, and performs printing on a sheet by ejecting the first ink and the second ink from the first inkjet head and the second inkjet head while relatively moving the sheet, the first inkjet head, and the second inkjet head. In a pixel at an edge of a line drawing including a pixel formed by a dot with the first ink and plural dots with the second ink, the edge being in a landing deviation direction of a dot with the first ink relative to a dot with the second ink, the controller corrects either one of or both of an ejection amount of the first ink to a dot and an ejection amount of the second ink to a dot located farthest in the landing deviation direction from among plural dots, so as to reduce a color shift at an edge.

In the inkjet printing apparatus according to the present invention, the controller may set the ejection amount after the correction, according to a landing deviation amount between a dot with the first ink and dots with the second ink.

DETAILED DESCRIPTION

Hereinbelow, an exemplary embodiment according to the present invention will be described with reference to the drawings. For all of the drawings, the same or equivalent symbols are attached to the same or equivalent components and constitutional elements. However, it should be noted that these drawings are schematic ones, and hence, are different from the actual figures. Furthermore, it is needless to say that there are cases when dimensional relationships or proportions are partially different between the drawings.

Furthermore, the exemplary embodiment described below is merely an example of an apparatus and the like given as an embodiment of the technical idea of the present invention, and materials, shapes, structures, arrangement, or other items of each constituting component of the technical idea of the present invention are not limited to those described below. Various modifications may be performed to the technical idea of the present invention within the scope of claims.

Figure 1:
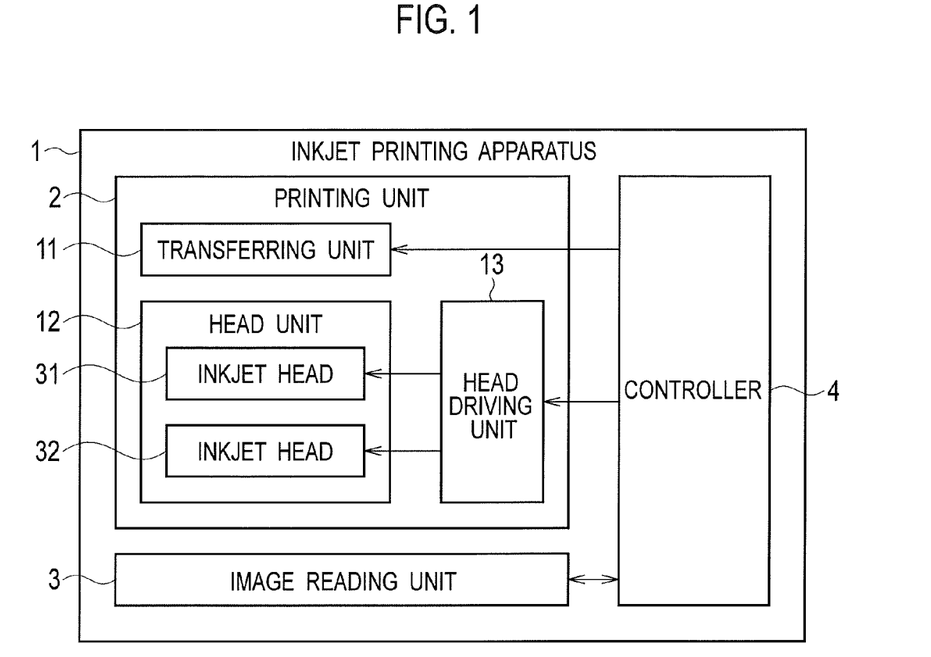
FIG. 1 is a block diagram illustrating a configuration of an inkjet printing apparatus according to an exemplary embodiment of the present invention.
Figure 2:
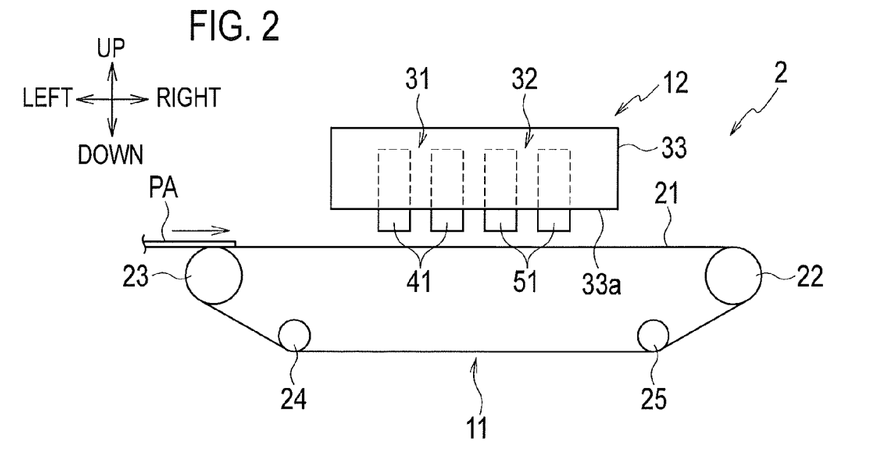
FIG. 2 is a configuration diagram schematically illustrating a printing unit.
Figure 3:
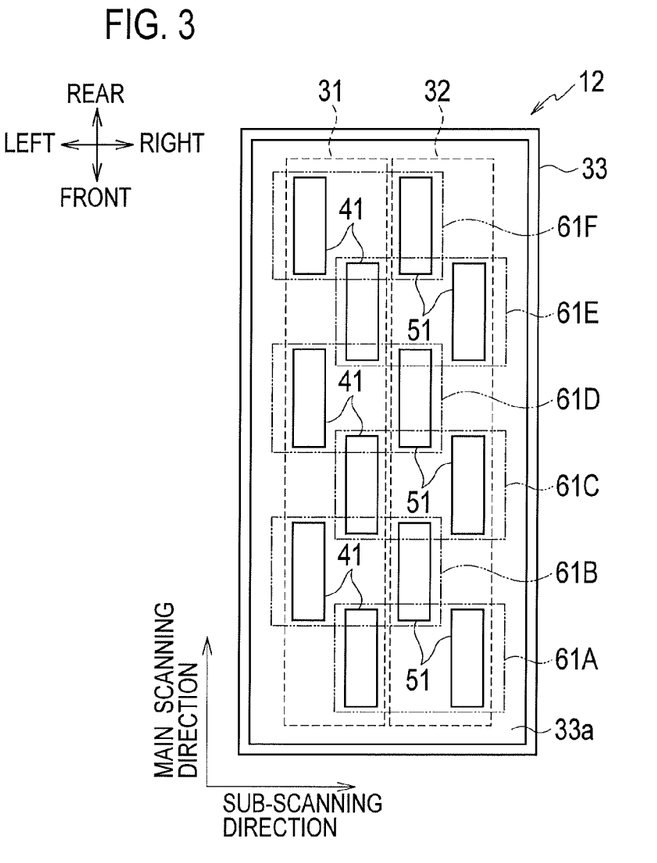
FIG. 3 is a plan view illustrating a head unit.
Figure 4:
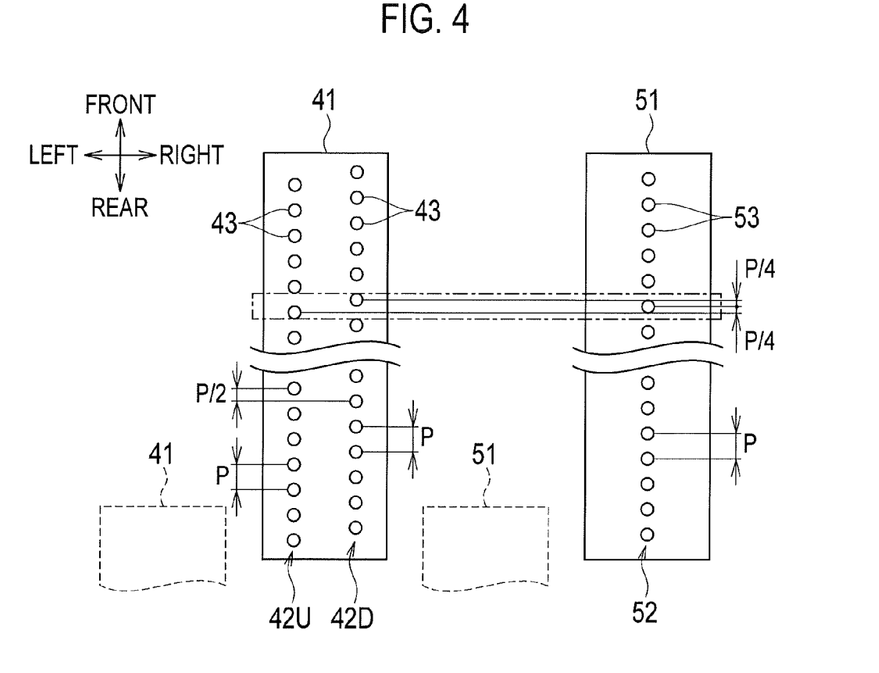
FIG. 4 is a configuration diagram schematically illustrating a head module.

FIG. 1 is a block diagram illustrating a configuration of an inkjet printing apparatus according to the exemplary embodiment of the present invention. FIG. 2 is a configuration diagram schematically illustrating a printing unit of the inkjet printing apparatus illustrated in FIG. 1. FIG. 3 is a plan view illustrating a head unit. FIG. 4 is a configuration diagram schematically illustrating a head module. In the descriptions below, a front-rear direction represents a direction perpendicular to the paper surface of FIG. 2, and a front direction represents a front-surface direction of the paper. Furthermore, a vertical direction and a horizontal direction represent a vertical direction and a horizontal direction on the paper surface of FIG. 2, respectively. In FIG. 2, a transfer direction of a sheet PA represents a direction from left to right.

As illustrated in FIG. 1, an inkjet printing apparatus 1 according to the exemplary embodiment includes a printing unit 2, an image reading unit 3, and a controller 4.

The printing unit 2 prints a print image on a sheet PA while transferring the sheet PA. The printing unit 2 includes a transferring unit 11, a head unit 12, and a head driving unit 13.

The transferring unit 11 transfers the sheet PA. As illustrated in FIG. 2, the transferring unit 11 includes a transfer belt 21, a driving roller 22, and driven rollers 23, 24, and 25.

The transfer belt 21 transfers the sheet PA while sucking and holding the sheet PA. The transfer belt 21 is a circular-shaped belt that is laid around the driving roller 22 and the driven rollers 23, 24, and 25. The transfer belt 21 has a large number of belt holes formed thereon to suck and hold the sheet PA. The transfer belt 21 sucks and holds the sheet PA on the upper surface of the transfer belt 21 with suction force generated through the belt holes by drive of a non-illustrated fan. The transfer belt 21 circulates in a clockwise direction in FIG. 2, so that the sheet PA sucked and held is transferred toward the right direction.

The driving roller 22 circulates the transfer belt 21. The driving roller 22 is driven with a non-illustrated motor.

The driven rollers 23-25 are driven via the transfer belt 21 so as to follow the driving roller 22. The driven roller 23 is disposed to the left of the driving roller 22 at the height approximately same as that of the driving roller 22. The driven rollers 24 and 25 are disposed below the driving roller 22 and the driven roller 23 in a manner such that the driven rollers 24 and 25 are spaced apart from each other in a horizontal direction at approximately the same height.

The head unit 12 ejects ink on the sheet PA transferred by the transferring unit 11 to print an image. The head unit 12 is disposed above the transferring unit 11. The head unit 12 includes an inkjet head 31 (second inkjet head), an inkjet head 32 (first inkjet head), and a head holder 33.

The inkjet head 31 ejects a black (K) ink (second ink) on the sheet PA to be transferred. The inkjet head 31 includes six head modules 41 as illustrated in FIG. 3.

In the inkjet head 31, the six head modules 41 are arranged in a staggered manner along a front-rear direction (main scanning direction) perpendicular to a transfer direction (sub-scanning direction) of the sheet PA. More specifically, the six head modules 41 are arranged along the front-rear direction in a way that they are alternately shifted in the horizontal direction.

As illustrated in FIG. 4, each of the head modules 41 includes two nozzle lines 42U and 42D. Note that FIG. 4 is a diagram illustrating the head module 41, and a head module 51, which will be described later, of the head unit 12 as viewed from the bottom.

The nozzle lines 42U and 42D are arranged in parallel to the horizontal direction (sub-scanning direction). Each of the nozzle lines 42U and 42D includes plural nozzles 43.

Each of the nozzles 43 ejects a black ink. In the head module 41, it is possible to vary the number of droplets (the number of drops) of ink for one pixel ejected from one nozzle 43, thereby performing gradation printing that expresses various densities according to the number of drops. The nozzle 43 is opened to the bottom surface of the head module 41. In each of the nozzle lines 42U and 42D, the nozzles 43 are arranged along the front-rear direction (main scanning direction) at equal intervals with a predetermined pitch P. Furthermore, the nozzles 43 are arranged in a manner such that a nozzle 43 of the nozzle line 42U on the upstream side is positionally shifted from a nozzle 43 of the nozzle line 42D on the downstream side by half a pitch (P/2) in the main scanning direction.

The inkjet head 32 ejects, on the sheet PA to be transferred, a red (R) ink (first ink) having a luminance higher than that of the black ink. As illustrated in FIG. 3, the inkjet head 32 includes six head modules 51.

In the inkjet head 32, the six head modules 51 are arranged in a staggered manner along the front-rear direction (main scanning direction) as is the case with the head module 41 of the inkjet head 31. Furthermore, the six head modules 51 of the inkjet head 32 and the six head modules 41 of the inkjet head 31 are arranged so as to form six columns of head module columns 61A, 61B, 61C, 61D, 61E, and 61F. Each of the head module columns 61A-61F includes head modules 41 and 51 located in the same column along the transfer direction (sub-scanning direction) of the sheet PA. Note that the head module columns 61A, 61B, 61C, 61D, 61E, and 61F are also collectively referred to as head module columns 61 by omitting an alphabetic letter added in the symbol of each of the head module columns 61A-61F.

As illustrated in FIG. 4, the head module 51 has a nozzle line 52. The nozzle line 52 includes plural nozzles 53.

Each of the nozzles 53 ejects a red ink. In the head module 51, it is possible to vary the number of droplets (the number of drops) of ink for one pixel ejected from one nozzle 53 as with the head module 41. The nozzle 53 is opened to the bottom surface of the head module 51. The nozzles 53 are arranged along the front-rear direction (main scanning direction) at equal intervals with the pitch P. Furthermore, one nozzle 53 is disposed at a middle position between the nozzle 43 of the nozzle line 42U and the nozzle 43 of the nozzle line 42D of the head module 41 in the front-rear direction (main scanning direction).

The head holder 33 holds the head modules 41 and 51. The head holder 33 is formed so as to have substantially a hollow cuboid shape. The head holder 33 is disposed above the transferring unit 11. The head holder 33 has a bottom surface 33a provided with plural opening portions (not illustrated) at predetermined positions, and the head modules 41 and 51 are attached to the opening portions. The head holder 33 holds the head modules 41 and 51 in a manner that the lower portion of each of the head modules 41 and 51 protrudes downward from the opening portions.

The head driving unit 13 drives the inkjet heads 31 and 32. More specifically, the head driving unit 13 drives the head module 41 of the inkjet head 31, thereby causing the nozzle 43 to eject the black ink. Furthermore, the head driving unit 13 drives the head module 51 of the inkjet head 32, causing the nozzle 53 to eject the red ink.

The image reading unit 3 optically reads an image of an original to generate image data.

The controller 4 controls operations of each unit in the inkjet printing apparatus 1. The controller 4 is configured to include, for example, a CPU, a RAM, a ROM, and a memory unit such as a hard disk (not illustrated). The CPU of the controller 4 performs information processing on the basis of a program and setting information stored in the memory unit, whereby the controller 4 controls operations of each unit in the inkjet printing apparatus 1.

At the time of two-color printing, the controller 4 causes the inkjet heads 31 and 32 to eject the black ink and the red ink, respectively.

Here, as described above, the inkjet head 31 has two nozzle lines 42U and 42D having respective nozzles 43 arranged at the pitch P in a manner such that they are positionally shifted with each other by half a pitch (P/2) in the main scanning direction. The inkjet head 32 has only one nozzle line 52 disposed having nozzles 53 arranged at the pitch P. With the arrangement of the nozzles as described above, the inkjet head 31 can perform printing with a resolution in the main scanning direction as high as twice that of the inkjet head 32.

At the time of two-color printing, the controller 4 uses the two nozzle lines 42U and 42D of the inkjet head 31 to make the resolution of black twice that of red in the main scanning direction. Furthermore, the controller 4 controls timings of ejections by the inkjet heads 31 and 32 so that the pitch of dots of black in the sub-scanning direction is P/2 and the pitch of dots of red is P.

With this operation, the controller 4 makes the resolution of each of black and red in the sub-scanning direction equal to that in the main scanning direction. More specifically, at the time of two-color printing, the controller 4 makes the resolution of black twice that of red both in the main scanning direction and in the sub-scanning direction.

Figure 5:
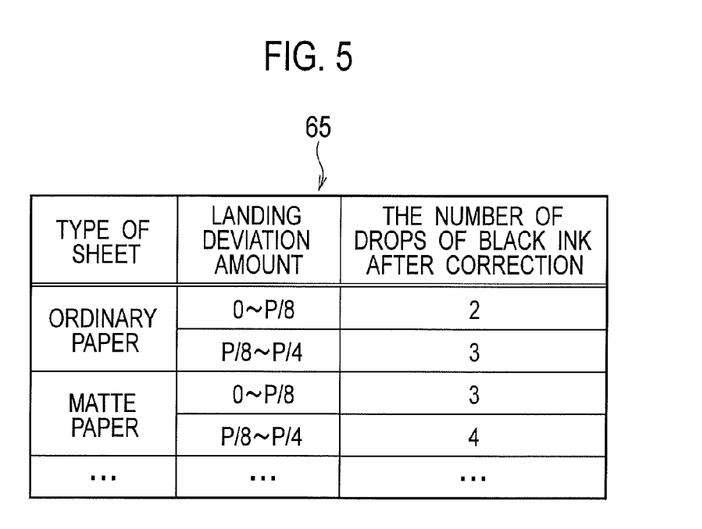
FIG. 5 is a correction table for a deviation correcting process.

The controller 4 stores a correction table 65 as illustrated in FIG. 5. The correction table 65 is a table showing a relationship between the number of drops of black ink after correction through a deviation correcting process, which will be described later, and the landing deviation amount, which will also be described later. The controller 4 refers to the correction table 65 in the deviation correcting process performed at the time of two-color printing to correct the number of drops of black ink for the dot to be corrected.

Next, the landing deviation amount will be described.

As described above, in the main scanning direction, the nozzle 53 of the head module 51 is disposed at the middle position between the nozzle 43 of the nozzle line 42U and the nozzle 43 of the nozzle line 42D of the head module 41. In the head holder 33, the head modules 41 and 51 are arranged in a manner such that the nozzles 43 and 53 are arranged as described above.

At the time of two-color printing, one pixel is formed using two nozzles 43 adjacent in the main scanning direction in the nozzle lines 42U and 42D of the head module 41, and one nozzle 53 of the head module 53 located at the middle position between the two adjacent nozzles 43. More specifically, one pixel is formed using one nozzle 53, a nozzle 43 whose center is spaced apart by P/4 from the center of this nozzle 53 toward the front direction, and a nozzle 43 whose center is spaced apart by P/4 from the center of this nozzle 53 toward the rear direction. One combination of the nozzles 43 and 53 that are used to form one pixel in the head modules 41 and 51 is surrounded by the dot-and-dash line in FIG. 4.

Figure 6:
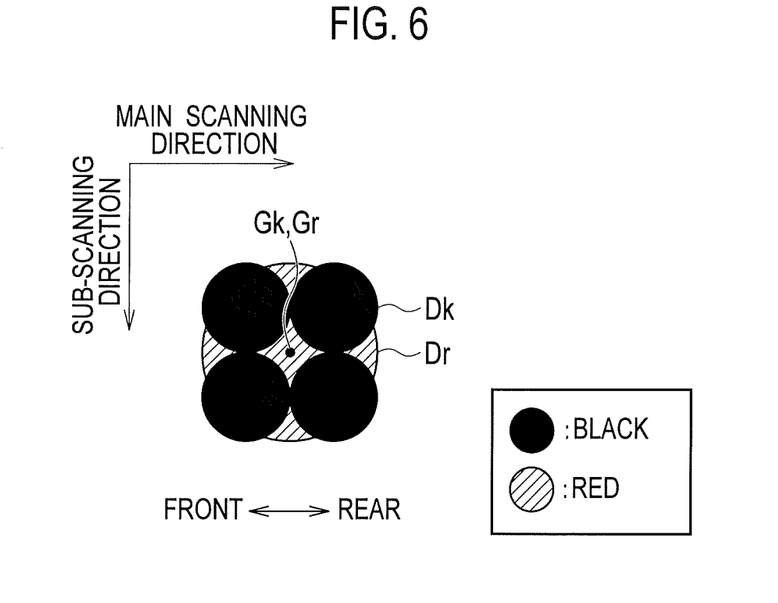
FIG. 6 is a diagram illustrating an example of a dot image of a pixel printed with two color inks.

At the time of two-color printing, the black pixel in the image data to be printed is printed using two color inks, black and red. This is because spaces between dots with the black ink are filled with the red ink to improve the print image quality. FIG. 6 illustrates a dot image of a pixel printed with two color inks as described above.

As described above, at the time of two-color printing, the resolution of black is twice that of red both in the main scanning direction and in the sub-scanning direction. For this reason, as illustrated in FIG. 6, one pixel of two-color printing is formed with four black dots Dk and one red dot Dr. The black ink ejected from the nozzle 43 of the head module 41 is landed on the sheet PA, thereby forming the black dots Dk. The red ink ejected from the nozzle 53 of the head module 51 is landed on the sheet PA, thereby forming the red dot Dr. The positions of the dots Dk and Dr in the main scanning direction correspond to the positions of the nozzles 43 and 53.

With the arrangement of the nozzles 43 and 53 as illustrated in FIG. 4, a position Gk of the center of gravity of landed black matches a position Gr of the center of gravity of a dot Dr in the main scanning direction as illustrated in FIG. 6. The gravity center position Gk of landed black is equal to a gravity center position of positions of four landed dots Dk (gravity center position). The gravity center position Gk of landed black in the main scanning direction is located at the middle position between the gravity center positions of two dots Dk along the main scanning direction. The gravity center position Gk of landed black in the sub-scanning direction is located at the middle position between gravity center positions of two dots Dk along the sub-scanning direction. In the sub-scanning direction, timings of ejections from the head modules 41 and 51 are controlled so that the gravity center position Gk of landed black and the gravity center position Gr of a dot Dr are matched with each other.

With the inkjet printing apparatus 1, misalignment of mounting positions of the head modules 41 and 51 with respect to the head holder 33 may occur. With this misalignment, nozzles 43 and 53 that are used to form one pixel may be misaligned in the main scanning direction. In other words, the nozzle 53 may be positionally shifted from the middle position between the two nozzles 43 in the main scanning direction.

Figure 7:
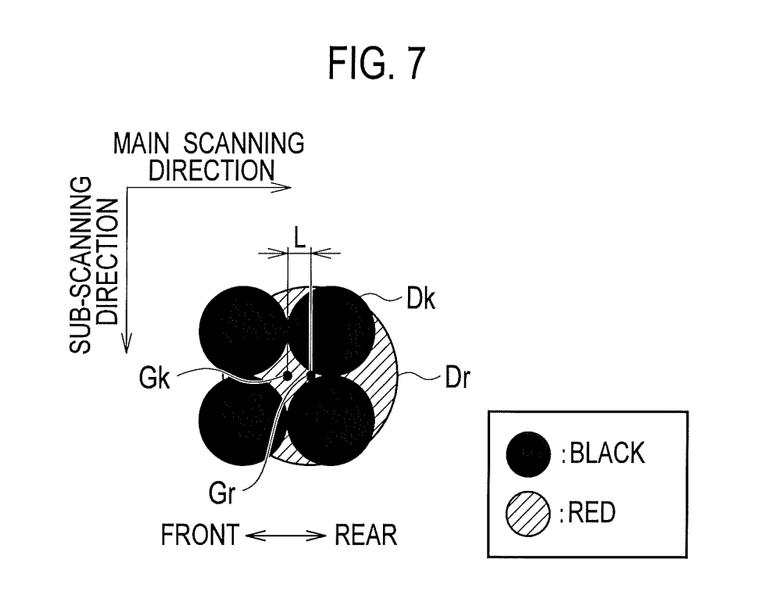
FIG. 7 is a diagram illustrating another example of a dot image of a pixel printed with two color inks.

FIG. 7 illustrates one example of a dot image of one pixel including four dots Dk and one dot Dr as in FIG. 6 and formed with the head modules 41 and 51 having nozzles positionally shifted in the main scanning direction as described above.

In the example of FIG. 7, the gravity center position Gk of landed black is shifted by L toward the front direction with respect to the gravity center position Gr of a dot Dr. In other words, in the example of FIG. 7, as compared with the case of FIG. 6, the dot Dr is positionally shifted by L toward the front direction with respect to each of the dots Dk. This L represents the landing deviation amount L. More specifically, the landing deviation amount L is the amount of shift which the arrangement of dots Dr and Dk has in the case where positional shift of the nozzles exists in the main scanning direction. The landing deviation amount L becomes zero in the case where no positional shift of the nozzles exists in the main scanning direction and landed drops are located at originally intended positions. Furthermore, the landing deviation amount L corresponds to a distance between the central position of a nozzle 53 in the main scanning direction and the middle position between two nozzles 43 that are used to form one pixel with the nozzle 53.

Here, in the inkjet printing apparatus 1, there is a possibility that the head modules 41 and 51 are positionally misaligned. Thus, by printing a test pattern in advance, a correspondence relationship between the nozzles 43 and 53 for forming one pixel is determined on the basis of the results of the test pattern. At this time, two nozzles 43 closest to the nozzle 53 in the main scanning direction are selected to form one pixel with the nozzle 53. For this reason, the maximum value of the landing deviation amount L is P/4.

It should be noted that, in the case where the head modules 41 and 51 are positionally misaligned in the sub-scanning direction, such positional misalignment is corrected by controlling of the timings of ejections by the head modules 41 and 51.

The landing deviation amount L is detected in the following manner. First, the controller 4 controls the printing unit 2 to print a test pattern. The test pattern is obtained by forming dots with the black ink and the red ink into a predetermined pattern.

After the test pattern is printed, the image reading unit 3 reads the printed image, whereby image data is generated. Then, the controller 4 analyzes the image data of the test pattern to calculate a position of each dot. The controller 4 obtains positional relationships between the nozzles 43 and 53 in the head modules 41 and 51 in the main scanning direction on the basis of the positions of each dot thus calculated. The controller 4 obtains, for each of the module columns 61, the positional relationship between the nozzles 43 and 53 in the main scanning direction.

Then, the controller 4 determines the correspondence relationship between the nozzles 43 and 53 used for forming one pixel, on the basis of the positional relationship between the nozzles 43 and 53 in the main scanning direction. The controller 4 determines the correspondence relationship between the nozzles 43 and 53 for each of the head module columns 61.

After determining the correspondence relationship between the nozzles 43 and 53, the controller 4 calculates the landing deviation amount L. More specifically, the controller 4 calculates, as the landing deviation amount L, a distance between the central position of the nozzle 53 in the main scanning direction and the middle position between the two nozzles 43 that are used to form one pixel with the nozzle 53.

Furthermore, the controller 4 also obtains a red deviation direction. The red deviation direction represents a direction in which the landed red ink is deviated with respect to the black ink. In the case where the central position of the nozzle 53 is located forward of the middle position between the two nozzles 43 that are used to form one pixel with the nozzle 53, the red deviation direction is the forward direction. In the case where the central position of the nozzle 53 is located rearward of the middle position between the two nozzles 43 that are used to form one pixel with the nozzle 53, the red deviation direction is the rear direction.

The controller 4 obtains the landing deviation amount L and the red deviation direction for each of the head module columns 61, and stores them.

Furthermore, the controller 4 obtains the amount of positional misalignment of the head modules 41 and 51 in the sub-scanning direction on the basis of the positions of dots of each color in the image data of the test pattern. Then, on the basis of the amount of positional misalignment, the controller 4 determines the ejection timing correction amount of the head modules 41 and 51 to correct the positional misalignment in the sub-scanning direction.

Next, operations performed by the inkjet printing apparatus 1 at the time of two-color printing will be described with reference to the flowchart illustrated in FIG. 8.

Figure 8:
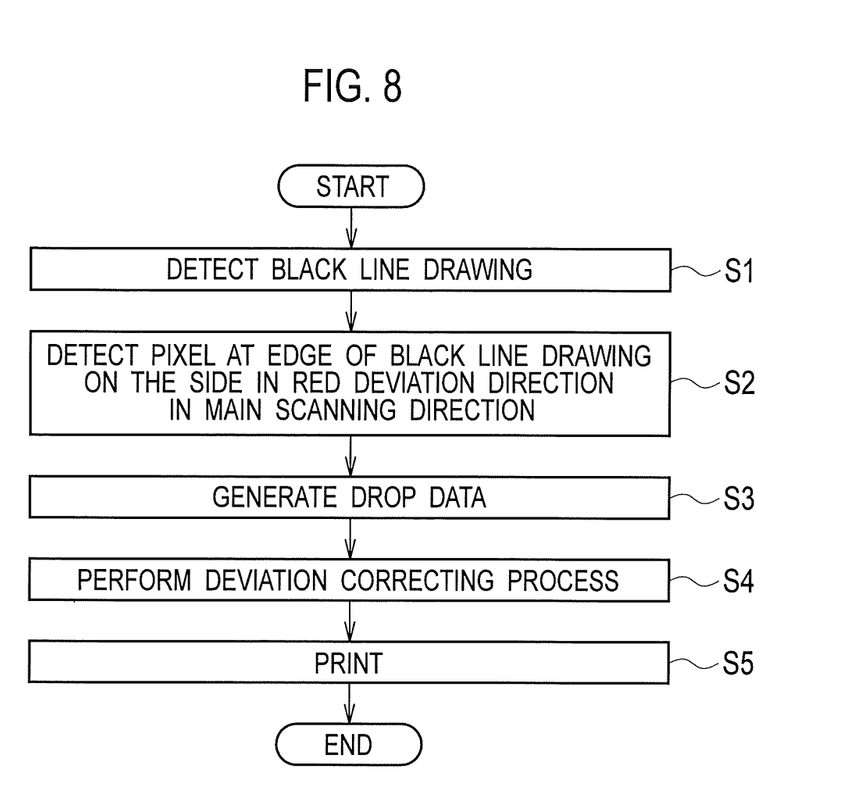
FIG. 8 is a flowchart for explaining operations performed by the inkjet printing apparatus at the time of two-color printing.

In step S1 in FIG. 8, the controller 4 detects a line drawing formed by black pixels in image data to be printed. The line drawing is a vector image such as a character and a thin line.

Then, in step S2, the controller 4 detects a pixel of an edge of a black line drawing located on the side of the red deviation direction in the main scanning direction. Here, as described above, the red deviation direction is determined for each of the head module columns 61. Thus, for each region in the image data corresponding to each of the head module columns 61, the controller 4 detects a pixel of an edge on the side of the red deviation direction associated with the corresponding head module columns 61.

Figure 9:
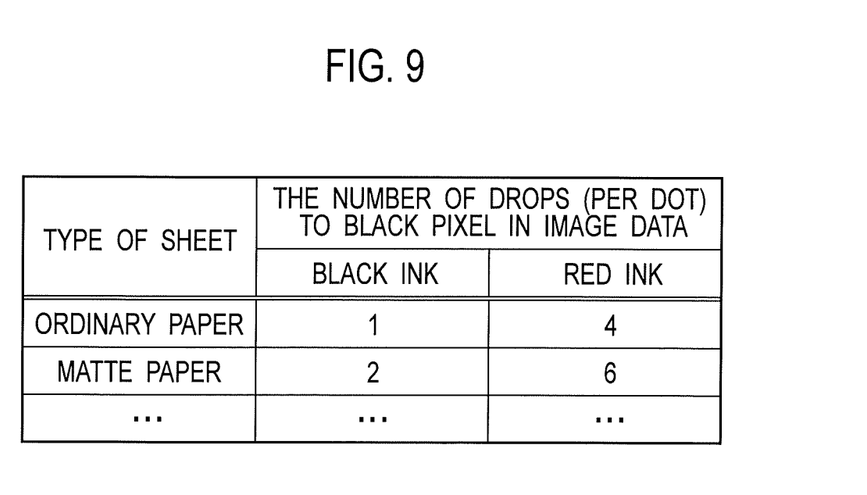
FIG. 9 is a table showing the number of drops of black ink and red ink per dot for a black pixel in image data.

Then, in step S3, the controller 4 generates drop data concerning black and red colors on the basis of the image data to be printed. The drop data on each of the colors is data indicating the number of drops of ink of each of the colors ejected for each dot. The controller 4 generates drop data according to types of sheets, on the basis of color profile set in advance. Here, the number of drops for each dot of black ink and red ink for a black pixel on the image data is shown in FIG. 9 as an example. In FIG. 9, in the case where the type of sheets used for printing is ordinary paper, dots Dk illustrated in FIG. 6 and FIG. 7 are each formed with one drop, and each dots Dr illustrated in FIG. 6 and FIG. 7 are each formed with four drops.

The explanation is returned to FIG. 8. After the drop data is generated, in step S4, the controller 4 performs a deviation correcting process. More specifically, the controller 4 increases the number of drops to a correction target black dot located on the side of the red deviation direction in a pixel located at an edge of the black line drawing on the side of the red deviation direction detected in step S2, so as to increase the size of this dot. At this time, the controller 4 refers to the correction table 65 to correct, according to the landing deviation amount L in each of the head module columns 61, the number of drops of the black ink for the dot with black to be corrected for each region corresponding to each of the head module columns 61 in drop data.

For example, in the case where the type of sheet is ordinary paper, the number of drops of black prior to the correction is "1" as shown in FIG. 9, whereas the number of drops after the correction is increased to "2" as shown in the correction table 65 in FIG. 5 if the landing deviation amount L is smaller than P/8.

Then, in step S5, the controller 4 performs two-color printing. More specifically, the controller 4 rotationally drives the driving roller 22 of the transferring unit 11. With this operation, the transfer belt 21 circulates. Once the sheet PA is fed from a paper feed unit, not illustrated, the sheet PA is transferred by the transferring unit 11. The controller 4 ejects droplets of ink by operating the inkjet heads 31 and 32 on the sheet PA transferred by the transferring unit 11, on the basis of the drop data on black after the deviation correcting process and the drop data on red. Furthermore, the controller 4 uses the ejection timing correction amount, which has been determined in advance to correct the positional misalignment in the sub-scanning direction, to control the timings of ejections by the inkjet heads 31 and 32. With these operations, an image with two colors is printed on the sheet PA.

Figure 10:
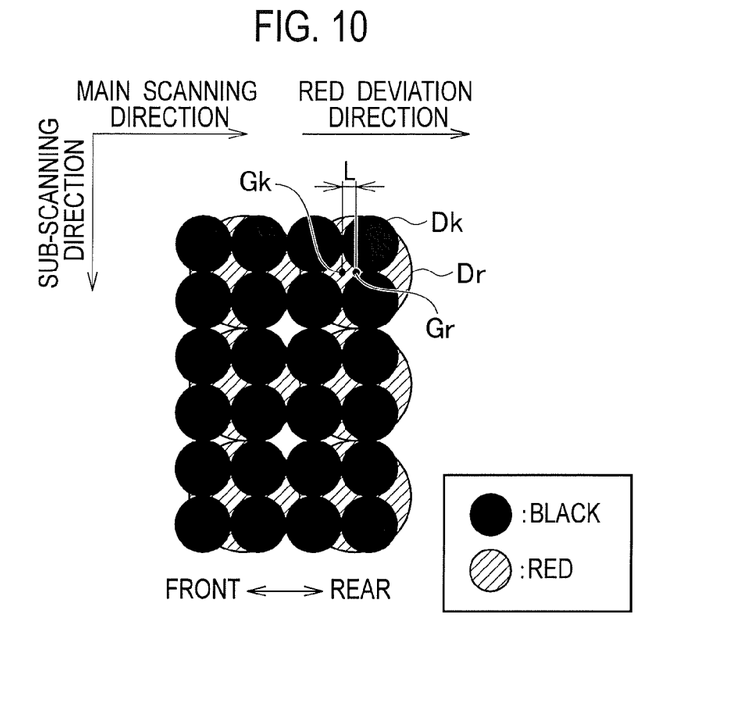
FIG. 10 is a diagram illustrating an example of a dot image of part of a line drawing printed without performing the deviation correcting process.

Here, FIG. 10 is a diagram illustrating an example of a dot image of part of a black line drawing printed without performing the deviation correcting process according to this exemplary embodiment. The image in FIG. 10 is formed by the head modules 41 and 51 having nozzles positionally misaligned in the main scanning direction as in FIG. 7. In FIG. 10, the red deviation direction is the rear direction.

In the image in FIG. 10, the dot Dr with red having a luminance higher than that of black protrudes beyond the dots Dk with black at the edge on the rear side, which is on the side of the red deviation direction. Thus, the edge on the rear side looks colored with red. In the case of the line drawing, such color shift at the edge causes significant deterioration in print image quality.

Figure 11:
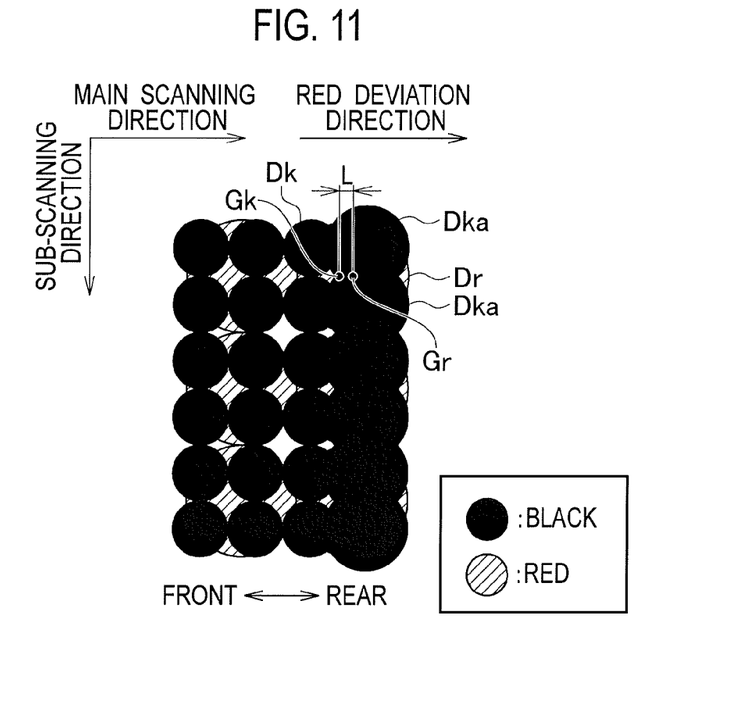
FIG. 11 is a diagram illustrating an example of a dot image of part of a line drawing printed while performing the deviation correcting process.

In relation to this, FIG. 11 illustrates an example of a dot image of part of a black line drawing printed while performing the deviation correcting process according to this exemplary embodiment. The image in FIG. 11 is formed by the head modules 41 and 51 having nozzles positionally misaligned in the main scanning direction as in FIG. 10.

In the image in FIG. 11, with the deviation correcting process, the black dots Dka located farthest in the red deviation direction in each pixel at the edge on the rear side, which is on the side of the red deviation direction, are formed with the number of drops increased from the number of drops in the original drop data. With this formation, the dots Dka are larger than the dots Dk formed with the number of drops in the original drop data. This leads to a reduction in the amount of protrusion of the dot Dr with red relative to the dot Dka with black at the edge on the rear side in the image in FIG. 11, as compared with the amount of protrusion of the dot Dr with red relative to the dot Dk with black at the edge on the rear side in the image in FIG. 10. As a result, in the image in FIG. 11 with the deviation correcting process being performed, the color shift at the edge of the line drawing is reduced as compared with the image in FIG. 10 on which the deviation correcting process is not performed.

As described above, at the time of two-color printing, in the inkjet printing apparatus 1, the controller 4 corrects the number of drops (ejection amount) to a black dot located on the side of the red deviation direction in a pixel at an edge of a line drawing in the red deviation direction printed with two color inks, so as to increase the size of this dot. With this process, the color shift at the edge of the line drawing in the printed image is reduced. As a result, it is possible to suppress the reduction in print image quality.

More specifically, according to the inkjet printing apparatus 1, in a pixel at an edge of a line drawing having a pixel formed by one dot of the first ink and plural dots of the second ink, the edge being in the landing deviation direction of a dot with the first ink relative to a dot with the second ink, the controller 4 corrects either one of or both of the number of drops to the dot with the first ink and the number of drops to a dot located farthest in the landing deviation direction of plural dots with the second ink, so as to reduce the color shift at the edge. With this process, it is possible to reduce the color shift at the edge of the line drawing in the printed image. As a result, it is possible to suppress the reduction in print image quality Furthermore, the controller 4 sets the number of drops after the correction to the dots to be corrected, according to the landing deviation amount L. This makes it possible to reduce the color shift at the edge of the line drawing while cutting waste of ink.

More specifically, according to the inkjet printing apparatus 1, the controller 4 sets the number of drops after the correction, according to the landing deviation amount L between the dot with the first ink and the dots with the second ink. This makes it possible to reduce the color shift at the edge of the line drawing while cutting waste of ink.

It should be noted that, in the descriptions in the exemplary embodiment described above, the positional misalignment of the head modules 41 and 51 in the sub-scanning direction is handled through the ejection timing correction. However, depending on conditions such as a speed at which the sheet PA is transferred, the positional misalignment may not be sufficiently corrected only through the ejection timing correction. In such a case, it may be possible to employ the deviation correcting process according to the exemplary embodiment in the case of the sub-scanning direction.

Figure 12:
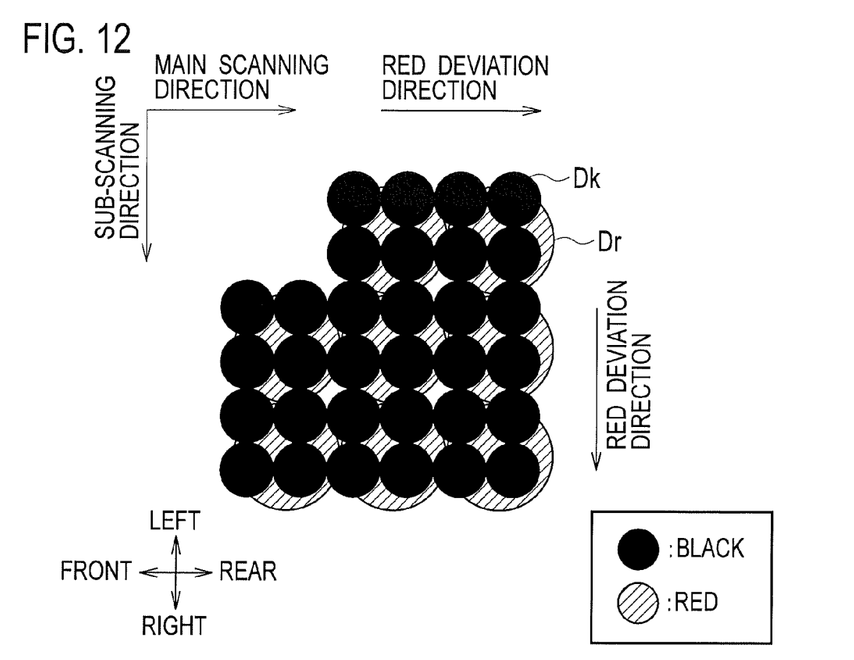
FIG. 12 is a diagram illustrating another example of a dot image of part of a line drawing printed without performing the deviation correcting process.

An example is given in which black dots Dk and red dots Dr are formed in a manner as illustrated in FIG. 12 without performing the deviation correcting process. In this case, in the main scanning direction (front-rear direction), the dots Dr are deviated towards the rear direction with respect to the dots Dk. In the sub-scanning direction (horizontal direction), the dots Dr are deviated toward the right direction with respect to the dots Dk. More specifically, the side of the red deviation direction in the main scanning direction is a rear side, and the side of the red deviation direction in the sub-scanning direction is a right side.

Figure 13:
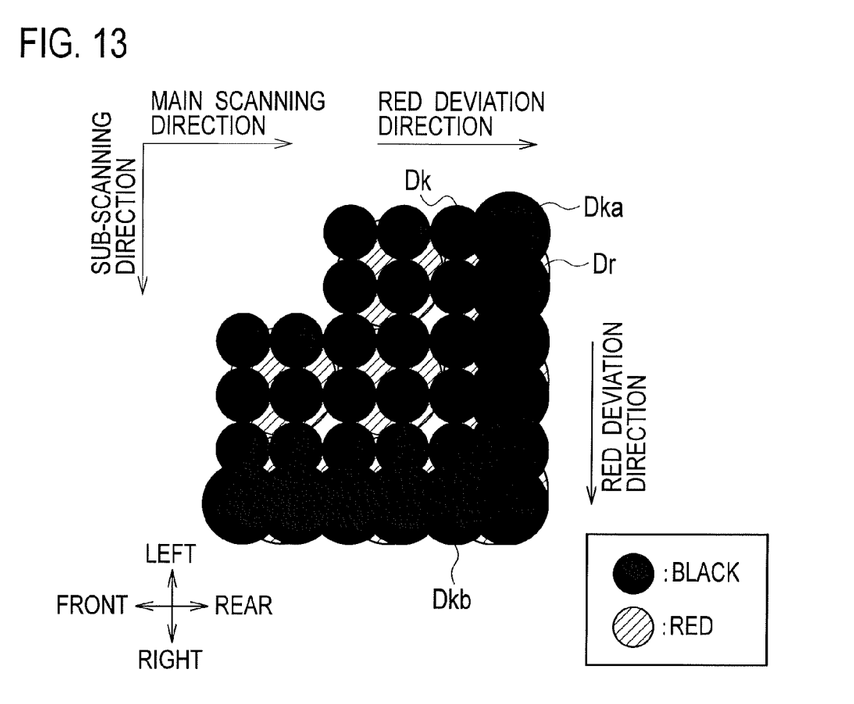
FIG. 13 is a diagram illustrating another example of a dot image of part of a line drawing printed while performing the deviation correcting process.

In this respect, in the case where the deviation correcting process is performed for the main scanning direction and the sub-scanning direction, an image as illustrated in FIG. 13 can be obtained. In the image illustrated in FIG. 13, with the deviation correcting process, for the main scanning direction, black dots Dka located farthest to the rear side are larger than dots Dk formed with the number of drops set in the original drop data in each pixel at an edge on the rear side, which is the side of the red deviation direction. For the sub-scanning direction, black dots Dkb located farthest to the right side are larger than dots Dk in each pixel at an edge on the right side, which is the side of the red deviation direction. With this configuration, the image illustrated in FIG. 13 having the deviation correcting process applied thereto has reduced color shift at the edge of the line drawing, as compared with the image illustrated in FIG. 12. As described above, in addition to the correction of the number of drops according to the landing deviation amount L in the main scanning direction, it may be possible to calculate the landing deviation amount in the sub-scanning direction, and correct the number of drops to dots to be connected, according to the calculated landing deviation amount in the sub-scanning direction.

Descriptions have been made of a case where, in the main scanning direction, the nozzles 53 of the head module 51 are placed at the middle position between the nozzles 43 in the nozzle line 42U and the nozzles 43 in the nozzle line 42D of the head module 41. However, the present invention can be applied not only to the nozzle arrangement as described above but also to any case in which landed drops are deviated.

Furthermore, in the descriptions in the exemplary embodiment described above, the black resolution is twice the red resolution in the main scanning direction and the sub-scanning direction, respectively. However, the ratio of resolutions is not limited to this. For example, the present invention can be applied to a case where the black resolution is three times the red resolution in the main scanning direction and the sub-scanning direction, respectively. In this case, one pixel is formed with one red dot and nine black dots having a 3-by-3 matrix. In the deviation correcting process, it is only necessary to correct black dots located farthest in the red deviation direction in a pixel at an edge in the red deviation direction.

Furthermore, in the exemplary embodiment described above, the correction process is performed only on black dots Dk located farthest in the red deviation direction in each pixel at an edge on the side of the red deviation direction. In other words, correction is performed on the first line of dots from the edge. However, in addition to this line, it may be possible to perform the correction on an area including plural lines of dots from the edge, these plural lines including dots located farthest in the red deviation direction and dots located second farthest in the red deviation direction.

Furthermore, in the exemplary embodiment described above, in the deviation correcting process, the number of drops (ejection amount) for black dots to be corrected is increased. However, it may be possible to perform correction by reducing the number of drops for red dots to reduce the color shift at the edge. Furthermore, it may be possible to reduce the color shift at the edge by performing correction on the black dots as well as the red dots. In these cases, it may be possible to correct the number of drops for dots to be corrected, according to the landing deviation amount L.

Furthermore, in the exemplary embodiment described above, a description has been made of the inkjet printing apparatus that ejects two color inks, black and red. However, the combination of color inks is not limited to this. It is only necessary to combine two color inks whose luminance difference is more than or equal to a predetermined value (for example, a difference in L*value in L*a*b* color system is 20 or more). For example, it may be possible to use a combination of cyan ink and yellow ink.

Furthermore, in the exemplary embodiment described above, a description has been made of a case where the line drawing with black pixels in the image data to be printed is printed with two color inks, black and red. However, the present invention can be applied to a case where the line drawing is printed with two color inks regardless of colors in the image data.

Furthermore, in the exemplary embodiment described above, a description has been made of a line-type inkjet printing apparatus that performs printing while transferring a sheet. However, in addition to this type of inkjet printing apparatus, the present invention can be applied to any inkjet printing apparatus, provided that it performs printing while the inkjet head is being moved relatively to the sheet. For example, the present invention can be applied to a serial-type inkjet printing apparatus that performs printing while moving the inkjet head.

The present invention is not limited to the above-described exemplary embodiment without making any modifications. At the time of implementing the present invention, the present invention may be embodied by modifying constituting elements thereof without departing from the main points of the present invention. Furthermore, various inventions may be formed by appropriately combining plural constituting elements disclosed in the exemplary embodiment described above. For example, it may be possible to delete several constituting elements from all the constituting elements described in the exemplary embodiment.

The present application claims priority based on Japanese Patent Application No. 2013-203316 filed in Japan on Sep. 30, 2013, the entire contents of which are incorporated herein by reference.

INDUSTRIAL APPLICABILITY

According to the inkjet printing apparatus of the present invention, in a pixel at an edge of a line drawing including pixels each formed by one dot of the first ink and plural dots of the second ink, this edge being in the landing deviation direction of a dot with the first ink relative to dots with the second ink, the controller corrects either one of or both of the ejection amount to the dot with the first ink and the ejection amount to the dots located farthest in the landing deviation direction of the plural dots with the second ink, so as to reduce the color shift at the edge. With this operation, it is possible to reduce the color shift at the edge of the line drawing in the printed image. As a result, it is possible to suppress the reduction in print image quality.

What is claimed is:

1. An inkjet printing apparatus comprising:
   a printing unit including a first inkjet head that ejects a first ink, and a second inkjet head that ejects a second ink having a luminance lower than that of the first ink by a predetermined value or more, with a resolution higher than that of the first inkjet head, the printing unit performing printing on a sheet by ejecting the first ink and the second ink from the first inkjet head and the second inkjet head while relatively moving the sheet, the first inkjet head, and the second inkjet head, and
   a controller that controls the printing unit, wherein
   in a pixel at an edge of a line drawing including a pixel formed by a dot with the first ink and a plurality of dots with the second ink, the edge being in a landing deviation direction with the first ink relative to dots with the second ink, the controller corrects at least one of the following so as to reduce a color shift at the edge:
      an ejection amount of the first ink to a dot; and
      an ejection amount of the second ink to a dot located farthest in the landing deviation direction from among a plurality of dots;
   the first inkjet head has a first series of nozzles arranged in a first direction perpendicular to a sheet feeding direction, the second inkjet head has a second and a third series of nozzles arranged in the first direction,
   each nozzle of the first series of nozzles is associated with a pair of nozzles of the second and third series of nozzles, each nozzle of the first, second and third series of nozzles has a center, and
   the center of each nozzle of the first series of nozzles is located between the centers of the associated pair of nozzles of the second and third series of nozzles.

2. The inkjet printing apparatus according to claim 1, wherein
   the controller sets the ejection amount after the correction, according to a landing deviation amount between a dot with the first ink and a dot with the second ink.

3. The inkjet printing apparatus according to claim 1, wherein the second inkjet head performs printing with twice higher resolution than that of the first ink jet head.

4. The inkjet printing apparatus according to claim 1, wherein
   the controller increases the ejection amount of the second ink to a dot so as to reduce a color shift at the edge.

5. The inkjet printing apparatus according to claim 1, wherein
   the controller reduces the ejection amount of the first ink to a dot so as to reduce a color shift at the edge.

6. The inkjet printing apparatus according to claim 1, wherein
   the controller corrects at least one of the ejection amount of the first ink and the ejection amount of the second ink in a pixel at the edge located in a main scanning direction and/or located in a sub-scanning direction.

* * * * *